(12) United States Patent
Rowley et al.

(10) Patent No.: US 8,707,934 B2
(45) Date of Patent: Apr. 29, 2014

(54) FUEL PREHEATER AND EMISSION REDUCING DEVICE FOR DIESEL AND OTHER FUEL INJECTED ENGINES

(76) Inventors: Gerald William Rowley, Delray Beach, FL (US); Genoveva Gonzalez, Delray Beach, FL (US)

( * ) Notice: Subject to any disclaimer, the term of this patent is extended or adjusted under 35 U.S.C. 154(b) by 84 days.

(21) Appl. No.: 13/186,454

(22) Filed: Jul. 19, 2011

(65) Prior Publication Data
US 2012/0012085 A1    Jan. 19, 2012

Related U.S. Application Data

(60) Provisional application No. 61/365,434, filed on Jul. 19, 2010.

(51) Int. Cl.
*F02M 31/00*    (2006.01)

(52) U.S. Cl.
USPC .......................................... 123/557; 123/538

(58) Field of Classification Search
USPC .................................... 123/557, 538
See application file for complete search history.

(56) References Cited

U.S. PATENT DOCUMENTS

| | | | |
|---|---|---|---|
| 3,070,645 A | 12/1962 | Tracht | |
| 3,110,296 A * | 11/1963 | Lundi | 123/557 |
| 3,377,266 A | 4/1968 | Salnikov | |
| 4,499,886 A * | 2/1985 | Hinds | 123/557 |
| 4,700,047 A * | 10/1987 | Crossett et al. | 219/205 |
| 5,411,005 A * | 5/1995 | Bohl et al. | 123/557 |
| 5,443,053 A * | 8/1995 | Johnson | 123/557 |
| 5,611,392 A | 3/1997 | Malecek et al. | |
| 6,578,532 B1 | 6/2003 | Rowley | |
| 8,225,772 B1 * | 7/2012 | Crowther et al. | 123/553 |
| 2006/0260588 A1 * | 11/2006 | Keiichiro et al. | 123/538 |
| 2008/0041350 A1 * | 2/2008 | Lee | 123/538 |
| 2008/0314370 A1 | 12/2008 | Weiche | |
| 2010/0050996 A1 | 3/2010 | Rowley | |

* cited by examiner

*Primary Examiner* — M. McMahon
(74) *Attorney, Agent, or Firm* — Bachman & LaPoint, P.C.

(57) ABSTRACT

Free heat or scavenged heat from the coolant system or circulating oil from the crankcase of an internal combustion engine supplies heat to a fuel pre-heater causing the liquid fuel to become superheated and partially vaporized. Liquid fuel preferably diesel is converted from a fluid at ambient temperature to a superheated fuel breaking down the hydrocarbons bonds of the fuel (cracking) before being sent directly to the fuel injectors. Water fog may be added to the air intake manifold. Catalysts inside the fuel preheater also aid in breaking down the fuel (cracking). The fuel pre-heater also operates as a coolant/oil filter to remove debris and sludge from the circulating coolant water or circulating crankcase oil of an internal combustion engine. Fuel efficiency has repeatedly been tested to increase 20% or better with highway driving. Exhaust emissions have been tested to show 20% or more reductions in greenhouse gases.

4 Claims, 4 Drawing Sheets

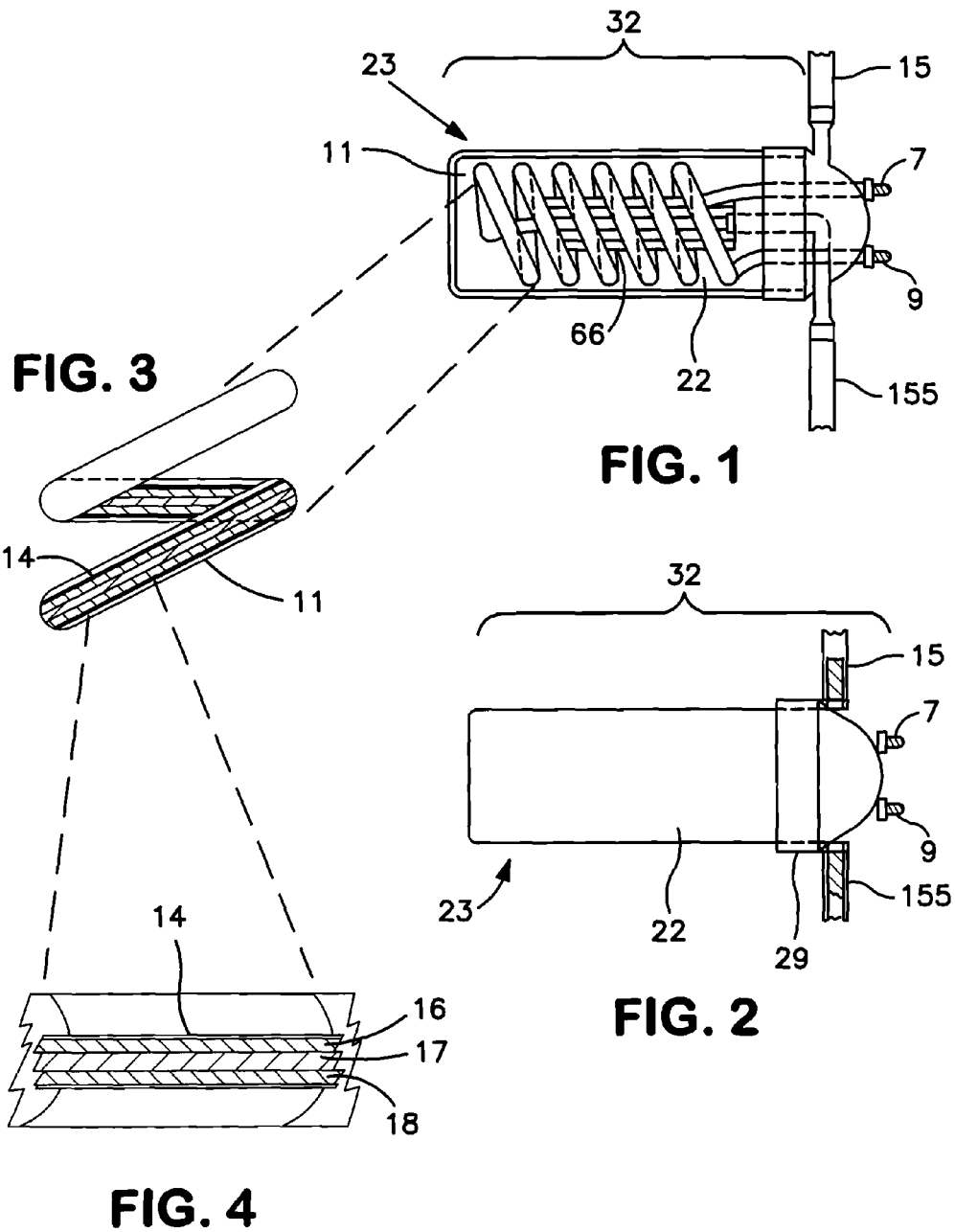

FUEL PREHEATER AND EMISSION REDUCING DEVICE FOR DIESEL AND OTHER FUEL INJECTED ENGINES

CROSS-REFERENCE TO RELATED APPLICATION

This application is a non-provisional application claiming the benefits of provisional application No. 61/365,434 filed Jul. 19, 2010.

FIELD OF INVENTION

The present invention relates to pre-heating fuel such as gasoline, alcohol, kerosene, diesel or ethanol before pumping the super heated fuel into a fuel rail system on mechanical or electronic fuel injected internal combustion engines.

BACKGROUND OF THE INVENTION

U.S. Pat. No. 6,578,532 (2003) to Rowley discloses a fuel vaporization system for carburetor type gasoline engines. A fuel vaporization chamber is in fluid communication with the gas tank. The fuel vaporization chamber is in thermal contact with the engine exhaust. The fuel vapors are sent to a molecule mixture box where water vapor is added and a measured amount of atmospheric air is added. A pressure differential in the molecule mixture box forces the homogeneous fuel vapor mixture to the intake manifold. Fuel efficiency is increased and emissions reduced by more complete combustion.

What is needed is a fuel preheater which allows for superheating fuel in a closed fuel delivery system that is tailored to both mechanical and electronic fuel injected engines with multiple injectors. The present invention supplies such a device.

SUMMARY OF THE INVENTION

A fuel pump connects to fuel lines from a fuel tank to a fuel filter/water separator assembly to a fuel injector pump. The fuel pump can be a pusher type mounted in the fuel tank or a puller type which is mounted close to the engine compartment or directly on the engine. In either case the fuel is directed away from the fuel tank to the fuel filter/water separator assembly. The fuel leaves the fuel filter/water separator assembly and enters a preheater device according to the invention which is heated by a heat source fluid such as coolant water via the heater hoses or bypass hoses from the radiator cooling system of the engine and/or oil from the engines crankcase. The coolant water thermostat mounted in the thermostat housing of the engine allows a controlled range of temperature for the fuel preheater device. The circulating crankcase oil does not have a thermostat. The fuel preheater device acts as a heat exchanger transferring heat from the circulating coolant water and/or crankcase oil to the fuel, allowing the fuel to become superheated as desired. The superheated fuel travels to the fuel rail of the engine via the injection pump. The quantity of superheated fuel delivered to the cylinders is controlled by opening and closing of the fuel injectors and the duration in the open position. Fuel not used in the combustion chambers passes through the return lines back to the fuel tank to complete a fuel cycle. This invention is non-obvious because it improves fuel mileage from 10% to 20%, reduces emissions, eliminates two mechanical blowers and a molecule mixture box from the '532 patent, uses engine coolant water and/or circulating crankcase oil for heat transfer medium, contains a catalyst, and can include a filter for the engine coolant system and/or circulating crankcase oil.

An aspect of the present invention is to supply superheated diesel fuel or other liquid fuels to fuel injectors to improve engine efficiency and reduce exhaust emissions. This technology has been coined by the inventor as P.C.C.R. technology. This stands for Pre-Combustion-Carbon-Reducing technology.

Another aspect of the present invention is to use heated circulating water coolant and/or circulating crankcase oil to superheat the fuel.

Another aspect of the present invention is to pass the superheated fuel to the injector pump and then to the fuel rail supplying fuel directly to the injections on the fuel rail.

Another aspect of the present invention is to provide a thermostatically controlled heat exchanger for producing the superheated fuel.

Another aspect of the present invention is to provide an embodiment that converts longer chains of hydrocarbons to shorter chains of hydrocarbons via a catalyst and preheating the fuel. This procedure also lowers the viscosity of the fuel to produce finer atomization of the fuel and more complete combustion. Another quality of this procedure is that it allows more oxygen to attach itself to the smaller droplets of fuel.

While in one aspect of the invention, the housing and cover are made from stainless steel and are welded together, it is a further aspect of one alternative embodiment of the present invention to provide an easy to close, seal and watertight enclosure for housing the circulating engine coolant and/or circulating crankcase oil. This housing allows for the operation of the heat transfer from the heated circulating engine coolant and/or heated circulating crankcase oil to superheat the fuel through the spiral fuel line.

Another aspect of the present invention is to provide a flexible metal or non-metallic housing/tubing with heat transfer capabilities to funnel and direct the fuel through the heating chamber.

Another aspect of the present invention is to provide a metal ion source in the fuel conduit, and this can be in the form of metal rods, thin flexible multi-layer ribbon or wires of differing metals and the like inside the flexible metal housing which offer an electrolysis affect creating ionization upon the passing fuels. This electrolysis (galvanic response) affect causes the fuel to be further broken down into even smaller hydrocarbon chains through ionization. Eventually, these smaller chains or clusters of hydrocarbons allow a more complete combustion inside the combustion chambers. This is witnessed by lower temperatures inside the cylinders during combustion and reduced exhaust emissions and reduced greenhouse gases.

Another aspect of the present invention is that it can provide a filter to collect debris floating or traveling in the circulating engine coolant and or circulating crankcase oil.

Other aspects of this invention will appear from the following description and appended claims, reference being made to the accompanying drawings forming a part of this specification wherein like reference characters designate corresponding parts in the several views.

BRIEF DESCRIPTION OF THE DRAWINGS

FIG. 1 is a drawing showing the cutaway side view of the fuel preheater (32) exposing the metal tubing or non-metallic tubing circuit, the in and out lines for the engine coolant, the in and out lines for the fuel, and the filter for the engine coolant and/or engine crankcase oil.

FIG. 2 is a side perspective of the fuel preheater showing the outside housing, the in and out lines for the engine coolant and/or crankcase oil, the in and out fuel fittings connecting the metal tubing or non-metallic tubing circuit carrying the fuel inside the housing.

FIG. 3 is an exploded view of a section of the metal tubing or non-metallic tubing circuit inside the fuel preheater embodiment and comprising a portion of the entire circuit and showing layers of metal ribbons/wires that form the catalyst.

FIG. 4 is a cross sectional and an exploded view of FIG. 3 showing the various layers of the different types of metal ribbons/wires inside the metal tubing or non-metallic tubing circuit.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The invention relates to a fuel preheater for diesel and other fuel injected engines. The fuel preheater device is physically connected to heater hoses or part of the engine coolant circulating system providing a bypass hose off the circulating water coolant system of the engine and/or hoses connecting circulating crankcase oil. About 140° F. to 190° F. heat is available to superheat the fuel in the fuel preheater from these heated fluids. The heat transfer chamber holding the circulating engine coolant will operate in the range of about 125° F. to 200° F. In this temperature range most liquid fuels will be superheated. Inside the heat transfer chamber is a conduit for the fuel which can be a flexible metal housing or tubing or non-metallic tubing that carries the fuel in and carries the superheated fuel out. The liquid fuel enters the beginning of the metal tubing or non-metallic tubing circuit at ambient fuel temperature. Upon exiting the metal tubing or non-metallic circuit the liquid fuel is superheated. This superheated fuel can also travel across a metal catalyst in the form of rods and/or a thin flexible multi-layer sandwich of differing types of metal ribbons/wires which further breaks down long hydrocarbon chains into shorter hydrocarbon chains. This galvanic reaction takes place among the different metal types coming into contact with each other. This reaction acts as a catalyst injecting metallic ions into the fuel that passes over the metal rods/ribbons/wires. The superheated fuel with the metal ions passes to the injector pump which forces the partially vaporized fluid to the fuel rail and then to the individual fuel injectors. The superheated fuel mixture is sprayed into each cylinder via the existing fuel injectors of the engine and mixes with the incoming air from the intake manifold and/or turbo.

Figure 5:
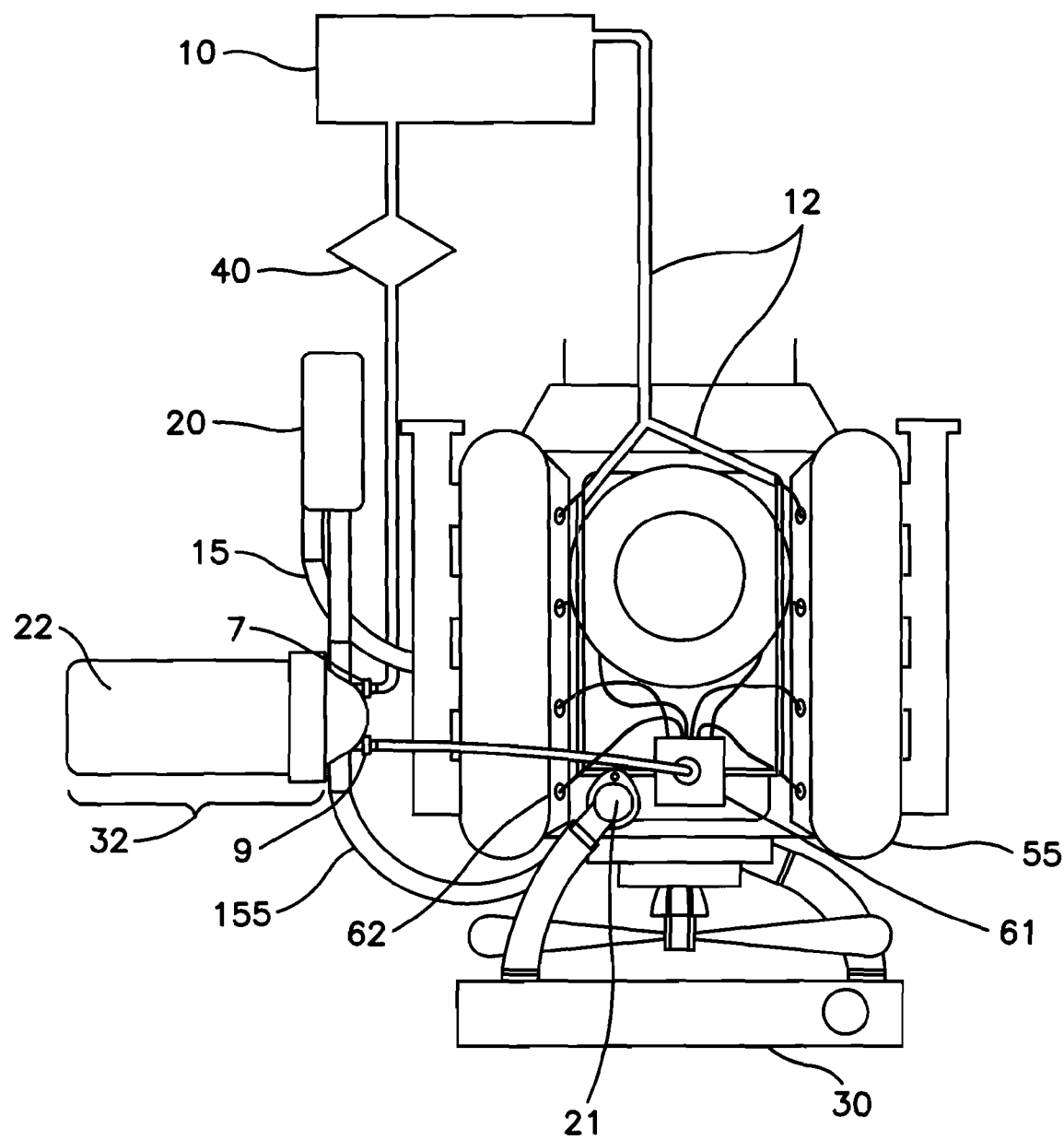
FIG. 5 is a top side perspective view and schematic of the fuel preheater embodiment in place and in communication with the engine fuel and engine coolant in an ordinary installation on a common V-8 diesel engine. This view shows only a connection to the water coolant circuit not the circulating crankcase oil circuit which could be used as a heat source.

Referring to FIG. 5, an internal combustion engine (55) has a fuel injector pump (61) sending fuel to fuel injectors (62). Unused fuel is returned to the fuel tank (10) via fuel return lines (12). Heat from the engine (55) is transferred to an engine coolant circulating through water jackets, engine heads, water pump, heater hoses (15),(155), radiator (30), etc. The coolant traveling through the heater hoses to and from the vehicle's heater core (20) can be used to supply heat to the fuel preheater (32). The engine's thermostat (21) controls the temperature of the coolant traveling through the heat exchanger chamber (22). The temperature of the coolant can be adjusted by changing the engine thermostat (21). Heat can also be scavenged from the engine's crankcase oil and delivered to the fuel preheater (32) in a similar way. For simplicity of demonstrating this scavenging heat affect only the heated engine coolant circuit will be shown. The other circuit would be very similar except it would be operating from circulating crankcase oil from the engine.

A fuel pump (40) pumps fuel from the fuel tank (10) to inlet fuel side (7) of the fuel preheater (32). The fuel travels through a spiral coil of metal tubing (11) (see also FIGS. 1-4) or non-metallic tubing inside the fuel preheater (32) and exits from the chamber via the outlet fuel side (9). Heat is transferred to the fuel as it passes through the metal tubing (11) or non-metallic tubing which is immersed inside the hot engine coolant or hot engine crankcase oil circulating inside the heat exchanger chamber (22). Heat from the hot fluid transfers through the body of the metal tubing (11) or non-metallic tubing to the liquid fuel. The temperature of the fuel is controlled by capacitance (length×width) of the metal tubing (11), the temperature of the coolant inside the heat exchanger chamber (22), and the fuel flow requirements of the engine. The heat exchanger housing (23) is preferably made from nylon or stainless steel or other suitable material to resist boiling and freezing temperatures, above atmospheric pressures, and corrosion of the circulating coolants (fluids). The spiral coil of metal tubing (11) or non-metallic tubing acts as a conduit or vessel to channel the liquid fuel through the liquid heat source. The coil of metal tubing is preferably made from stainless steel for strength and durability. However, the tubing (11) can be made from any of a list of durable tubing products on the market today and known to persons skilled in the art which withstand various fuel types, fuel pressures, and the stresses of low and high temperatures. In addition, the coil of tubing (11) acts as a housing and/or support for the metal rods and/or ribbon or wire (14).

The catalyst in this embodiment is a tri-metal ribbon or wire (14) which lies inside the metal tubing (11) which is mounted inside the heater chamber housing (23). The tri-metal ribbon or wire (14) can be made from a variety of metals. One wire, preferably the center ribbon or wire (17), should be made from zinc. The outer bands (16), (18) of the tri-metal ribbon or wire (14) can be made from copper (Cu), aluminum (Al), or any combination of metal ribbons or wires which support a galvanic reaction. As the heated liquid fuel travels over the tri-metallic ribbon/wires (14) it picks up metallic ions which further breaks down the hydrocarbon bonds in the fuel.

Referring now also to FIG. 1 the basic components of the fuel preheater (32) according to the invention are illustrated. Fuel preheater (32) would be mounted on or near the engine (55). The fuel preheater (32) converts liquid fuels to a superheated mixture of fuel which burns more completely in the internal combustion engine (55). The heat exchanger housing (23) supports the coiled metal or non-metal tubing (11) used in the heat exchange operation. The heat exchanger housing (23) is preferably nylon or stainless steel metal or any high temperature resistant composite material. Heated engine coolant enters the heat exchanger housing (23) through the inlet side (15), for example coming from the vehicle heater core (20) or any extension of hosing connecting to the engine coolant system. After heat exchange, coolant exits the heat exchanger housing from the outlet side (155). The heated coolant returns back to the coolant circuit of the engine.

Liquid fuel enters the beginning of the coiled metal or non-metallic tubing (11) for example through a bulkhead fitting (7). The fuel passes through the metal or non-metallic tubing (11) picking up heat as it moves through the heated tubing and exits fuel preheater (32) through outlet bulkhead fitting (9).

The unused heated and ionized fuel not used by the injectors (62) passes through a return line (12) back to the fuel tank (10) to complete the liquid fuel circuit. The heated fuel condenses and cools as it travels back to the fuel tank (10). An engine that is an EFI (Electronic Fuel Injection) is controlled by an ECU (Electronic Control Unit). The throttle control of the engine is maintained by the computer module. The computer senses when the throttle body (not shown) is opening up as in an acceleration mode which relays a signal to the ECU to allow the injectors to increase fuel flow to the cylinders.

Figure 6:
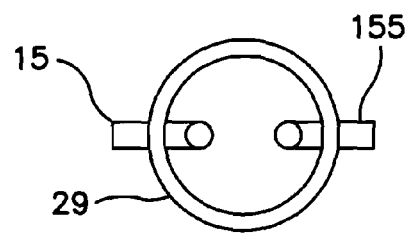
FIG. 6 is a top side perspective of the top cap of the fuel preheater showing the inlet and outlets for the heated circulating fluids.
Figure 7:
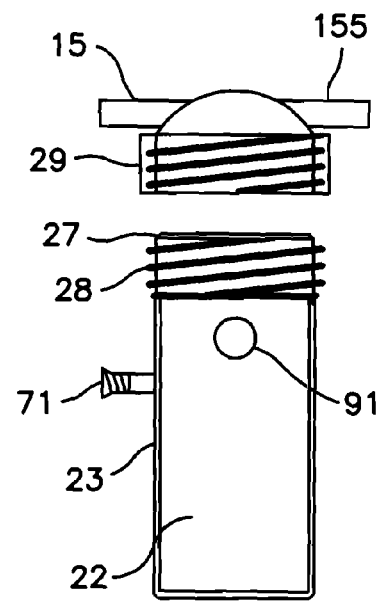
FIG. 7 is a side perspective of the fuel preheater showing an embodiment with a screw-on top and a screw-on housing canister. This drawing also shows alternative inlet and outlet ports for the entering and exiting liquid fuel.
Figure 8:
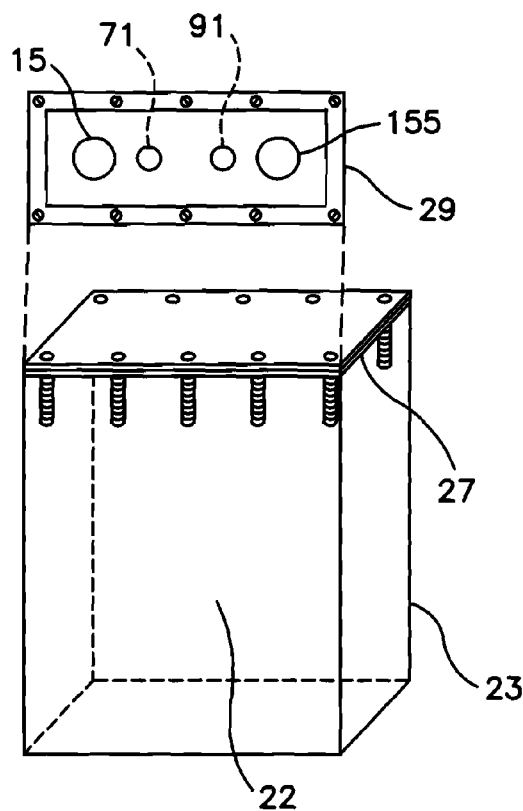
FIG. 8 is a side perspective of the fuel preheater showing a different embodiment with a rectangular housing canister with a screw down top with a gasket preferably an O-ring seal. This drawing shows a particular pattern of how the inlet and outlet ports for the heating fluids and the liquid fuel could be arranged. However, any number of patterns could be used to accomplish the transfer of heating inside the heating chamber.

FIGS. 6, 7 and 8 illustrate the inside of the fuel preheater (32), the spiral coil (11), and the individual components all of which can be seen in more detail. The bottom housing (22) has a top (29) which can be bolted to the housing (22) (See FIG. 8) with a gasket or "O"-ring (27) there between. The bottom of housing (22) as shown in FIG. 8 has built in threads to allow the top lid (29) to be securely fastened in place for example with bolts.

FIG. 7 shows the bottom of the housing (22) in a cylindrical embodiment with threads (28) built into the top of the housing (22) to allow the top cap (29) to be screwed down in place instead of using bolts. A gasket, preferably an "O" ring (27), physically seals the bottom housing (22) with the top cap (29). In addition, FIG. 7 shows alternative inlet (71) and outlet (91) ports for the liquid fuel to enter the housing chamber (22). FIG. 6 shows a top perspective looking directly down showing the inlet (15) and outlet (155) for connecting the coolant hoses to and from the engine coolant circuit.

FIG. 1 shows the inside of the housing (23) with the individual components.

The coiled line (11) sits in the center of the housing (23). In this embodiment placed in the middle of the coiled line (11) is a filter (66) which filters the heated coolant water and/or circulating engine crankcase oil and removes any slime or debris. FIG. 2 shows an overall side perspective showing the cap (29) and the housing (23) and a particular pattern for the inlet and outlet ports for the heated fluids and the liquid fuel to enter the heating chamber (22). FIG. 7 shows an alternative pattern of how the fuel can enter and exit the heater housing (23). FIG. 3 and FIG. 4 show an exploded view of the spiral tubing (11) located inside the housing chamber (22). FIG. 3 shows an exploded view of a subsection of the spiral tubing (11) holding a collection of metallic ribbons or wires mounted inside the spiral tubing (11). FIG. 4 shows a more exploded view of the metallic bundle or collection (14) including a layer or section of copper (Cu) (16), a layer or section of zinc (Zn) (17), and a layer or section of aluminum (Al) (18). Layers (16) and (17) can be made from a variety of different types of metals to complete the galvanic reaction.

Figure 9:
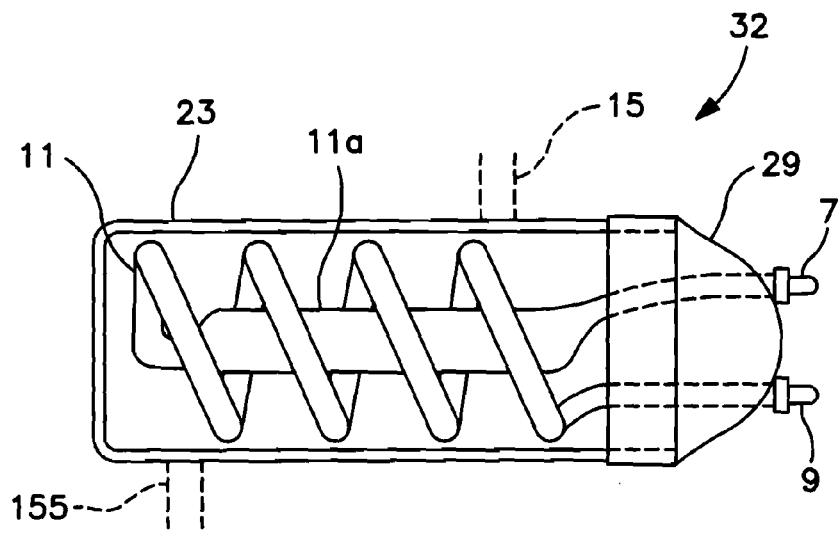
FIG. 9 is a side view of an embodiment having an enlarged straight section of the fuel conduit for housing catalyst in the form of metal rods.
Figure 10:
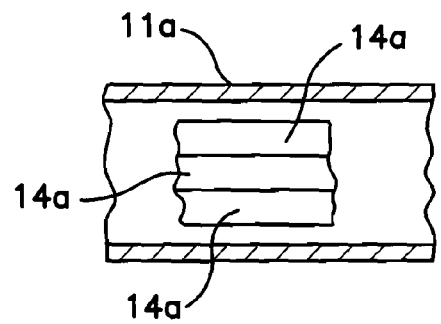
FIG. 10 is an enlarged section view of a portion of FIG. 9.

FIG. 9 illustrates an alternate embodiment of the invention wherein like numerals represent like parts. In this embodiment, tubing or conduit (11) is shown having an enlarged straight central portion (11a) which preferably has a greater diameter than the coiled portion of conduit (11). This allows catalyst to be positioned in a larger area such that the bands and wires of the embodiment of FIGS. 1, 3 and 4 can instead be a larger structure which is easier and less expensive to manufacture, and which can be more readily positioned in a straight tubing section of enlarged diameter. FIG. 10 shows an enlarged cross section of conduit portion (11a), showing rods (14a) of catalyst material positioned therein. These rods can be mounted to the inner side wall of conduit portion (11a), or could be positioned in any other suitable manner. As with wires (14), fuel passing rods (14a) is treated with metallic ions from rods (14a) which can help to break down the length of hydrocarbon chains in the fuel as desired.

Still referring to FIGS. 9 and 10, these figures also show a further alternate configuration for inlet (15) and outlet (155) for the heated liquid with which fuel is to be heated. In this embodiment, inlet (15) and outlet (155) are schematically illustrated as entering and exiting from housing (23) of the device, preferably in staggered fashion for better heating effects. This can simplify connection of the device into an engine compartment, and make it easier for a cover or top (29) to be assembled into an already installed housing (23) with conduit (11) attached to cover (29). This could also be the case with the embodiment shown in FIG. 8. In this regard, connectors for either of both of the heating fluid and fuel can be either in the housing (22) or cover (29), as desired, depending upon which position most facilitates installation of the device.

Referring back to the embodiment of FIGS. 9 and 10, when metallic rods (14a) are to be used as the catalyst for heated fuel, one preferred configuration of rods is a combination of zinc coated iron rods and aluminum rods. These can be configured such that there are two aluminum rods per each zinc coated iron rod, and this combination provides particularly desirable results with respects to enhancing proper combustion of the fuel. In such an embodiment, it is preferred for the rods to be adjacent to each other, preferably with the zinc coated iron rod between two aluminum rods. Of course other configurations of rods can also be used within the broad scope of the invention.

Figure 11:
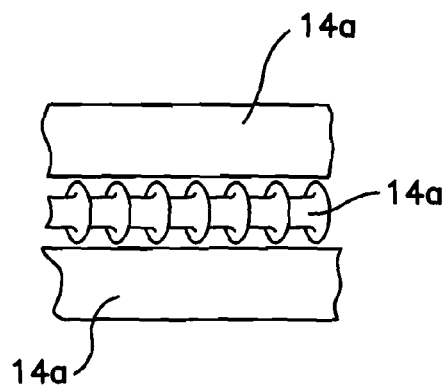
FIG. 11 is an enlarged view showing another embodiment of metal rods in accordance with the invention.

Referring to FIG. 11, another embodiment of the invention is illustrated, wherein rods 14a include a center rod which is threaded, and smooth rods in contact with the threaded rod. This serves to enhance the contact between rods and fuel and enhances the catalytic effect of the rods. In the embodiment shown, the center threaded rod can be the zinc coated iron rod, while the adjacent rods can suitable be aluminum. It should also be noted that for this and all other embodiments involving a source of metal ions, a combination of zinc and aluminum has been disclosed as one preferred embodiment. Other metals and metal combinations may likewise be suitable within the broad scope of the invention.

In the above description, some reference has been made to thermostats which can be used to control the temperature of coolant within the engine compartment and, thereby, temperature of coolant which is fed to fuel preheater (32). In this regard, this thermostat and control can be programmed to increase the temperature of coolant being delivered to fuel preheater (32) when the volume of fuel being fed to the engine is increased, and in this way the additional heat can still superheat the higher volumetric flow rate of fuel through fuel preheater (32).

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A fuel preheater for diesel and other fuel injected engines, comprising:
    a housing having an inlet and an outlet for a heat source liquid;
    a fuel conduit in the housing and having a fuel inlet and a fuel outlet whereby fuel flowing through the conduit is heated by heat source liquid in the housing;
    a metal ion source positioned within said fuel conduit, wherein the metal ion source comprises a plurality of metal rods, and wherein the plurality of metal rods comprises a combination of aluminum rods and zinc rods.

2. A fuel preheater for diesel and other fuel injected engines, comprising:
    a housing having an inlet and an outlet for a heat source liquid;
    a fuel conduit in the housing and having a fuel inlet and a fuel outlet whereby fuel flowing through the conduit is heated by heat source liquid in the housing;
    a metal ion source positioned within said fuel conduit,
    wherein the metal ion source comprises a plurality of metal rods, and wherein some of the metal rods are threaded rods.

3. A fuel preheater system for diesel and other fuel injected engine comprising:
    an engine having a plurality of fuel injectors;
    a fuel supply comprising a fuel tank, lines feeding fuel to the engine, and lines recycling unused fuel from the fuel injectors back to the tank;
    a preheater comprising a housing having an inlet and an outlet for a heat source liquid; and
    a fuel conduit in the housing and having a fuel inlet and a fuel outlet whereby fuel flowing through the conduit is heated by heat source liquid in the housing,
    wherein the fuel inlet receives fuel from the fuel tank and the fuel outlet conveys fuel to the fuel injectors, wherein a metal ion source is positioned within said fuel conduit, wherein the metal ion source comprises a plurality of metal rods, and wherein the plurality of metal rods comprises a combination of aluminum rods and zinc rods.

4. A fuel preheater system for diesel and other fuel injected engine comprising:
    an engine having a plurality of fuel injectors;
    a fuel supply comprising a fuel tank, lines feeding fuel to the engine, and lines recycling unused fuel from the fuel injectors back to the tank;
    a preheater comprising a housing having an inlet and an outlet for a heat source liquid; and
    a fuel conduit in the housing and having a fuel inlet and a fuel outlet whereby fuel flowing through the conduit is heated by heat source liquid in the housing,
    wherein the fuel inlet receives fuel from the fuel tank and the fuel outlet conveys fuel to the fuel injectors, wherein a metal ion source is positioned within said fuel conduit, wherein the metal ion source comprises a plurality of metal rods, and wherein some of the metal rods are threaded rods.

* * * * *